United States Patent
Wang

(10) Patent No.: US 11,002,374 B2
(45) Date of Patent: May 11, 2021

(54) PRESSURE BALANCED MIXING DEVICE

(71) Applicant: ING TZON CO., LTD., Changhua (TW)

(72) Inventor: Tsang-Min Wang, Changhua (TW)

(73) Assignee: ING TZON CO., LTD., Changhua (TW)

( * ) Notice: Subject to any disclaimer, the term of this patent is extended or adjusted under 35 U.S.C. 154(b) by 0 days.

(21) Appl. No.: 16/528,328

(22) Filed: Jul. 31, 2019

(65) Prior Publication Data

US 2020/0109789 A1 Apr. 9, 2020

(30) Foreign Application Priority Data

Oct. 9, 2018 (TW) .................................. 107135605

(51) Int. Cl.
*F16K 11/07* (2006.01)
*F16K 17/18* (2006.01)

(52) U.S. Cl.
CPC .......... *F16K 11/0716* (2013.01); *F16K 17/18* (2013.01)

(58) Field of Classification Search
CPC ................. F16K 17/18; F16K 11/0716; Y10T 137/86445
See application file for complete search history.

(56) References Cited

U.S. PATENT DOCUMENTS

| 3,103,231 A | * | 9/1963 | Moen | E03C 1/023 |
| | | | | 137/454.2 |
| 4,241,749 A | * | 12/1980 | Petursson | G05D 11/003 |
| | | | | 137/100 |
| 5,492,149 A | * | 2/1996 | Loschelder | F16K 11/0716 |
| | | | | 137/625.4 |

FOREIGN PATENT DOCUMENTS

| TW | M321486 U | 11/2007 |
| TW | M464562 U | 11/2013 |
| TW | M471518 U | 2/2014 |
| TW | I429838 B | 3/2014 |
| TW | I438362 B | 5/2014 |
| TW | M526637 U | 8/2016 |

* cited by examiner

*Primary Examiner* — Kevin R Barss
(74) *Attorney, Agent, or Firm* — Muncy, Geissler, Olds & Lowe, P.C.

(57) ABSTRACT

The invention discloses a pressure balanced mixing device comprising a balanced module including a fixed tube and a movable element including a cylinder which connects with two cups and is between the two cups blocking a cold-water inlet and a hot-water inlet of the fixed tube, wherein each cup has an opening and a base plate, each opening is in communication with a cold-water outlet and a hot-water outlet of the fixed tube. The cylinder has two side walls and two connecting rods. One of the two side walls is separated from the base plate of one of the two cups by a cold-water space, the other side wall is separated from the base plate of the other cup by a hot-water space. The cold-water space and the hot-water space are in communication with the cold-water inlet and the hot-water inlet of the fixed tube, respectively.

4 Claims, 5 Drawing Sheets

US 11,002,374 B2

PRESSURE BALANCED MIXING DEVICE

BACKGROUND OF THE INVENTION

1. Field of the Invention

The present invention relates to the control valve inside the faucet, particularly a balanced module in the hot and cold water mixing control valve.

2. Description of the Related Art

The conventional hot and cold water mixing faucet already comprises a control valve which can adjust automatically the amount of hot water and of cold water in accordance with the change of hot and cold water pressure, so that the temperature of the outlet mixed water can be maintained as constant as possible in order to solve the problem of extreme water temperature change.

The conventional control valve usually contains a balanced module inside, for example, TWI429838, TWI438362, TWM464562, TWM471518, TWM526637 and TWM321486. TWI438362 discloses the basic structure of the balanced module including a fixed valve tube and a movable spool movably disposed inside the fixed valve tube. The fixed valve tube has two ports, a plurality of annularly arranged cold-water through holes and a plurality of annularly arranged hot-water through holes. The interior of the movable spool has a cold-water perforation groove, a hot-water perforation groove and a bulkhead separating these two perforation grooves. The cold-water perforation groove and the hot-water perforation groove have a plurality of annularly arranged cold-water perforation holes and a plurality of annularly arranged hot-water perforation holes. The cold water (or the hot water) passes directly through the cold-water perforation groove (or the hot-water perforation groove) and flows out from the ports of the fixed valve tube after entering into the cold-water perforation groove (or the hot-water perforation groove) of the movable spool through the cold-water through holes (or the hot-water through holes) of the fixed valve tube. However, the balanced module described above has been used for many years and has not changed so far.

SUMMARY OF THE INVENTION

The present invention provides a pressure balanced mixing device having a balanced module, a cold-water inlet passage, a cold-water outlet passage, a hot-water inlet passage, and a hot-water outlet passage, wherein the balanced module comprises a fixed tube and a movable element movably disposed inside the fixed tube. The fixed tube is fixed and has a front section and a rear section in communication with each other. An end of the front section forms a hot-water outlet. A wall of the front section has at least a hot-water inlet. An end of the rear section forms a cold-water outlet. A wall of the rear section has at least a cold-water inlet. The cold-water inlet is in communication with the cold-water inlet passage. The hot-water inlet is in communication with the hot-water inlet passage. The cold-water outlet is in communication with the cold-water outlet passage. The hot-water outlet is in communication with the hot-water outlet passage. The movable element includes two cups and a cylinder connected with the two cups, wherein the cylinder is between the two cups. The two cups separately block the hot-water inlet and the cold-water inlet of the fixed tube, wherein each cup has an opening and a base plate opposite to the opening, the opening is in communication with the hot-water outlet and the cold-water outlet of the fixed tube and each base plate has a through hole. The cylinder has two opposite side walls and two connecting rods separately extended outwards from the two opposite side walls, wherein one of the two side walls is separated from the base plate of one of the two cups by a hot-water space, the other side wall is separated from the base plate of the other cup by a cold-water space. The hot-water space and the cold-water space are in communication with the hot-water inlet and the cold-water inlet of the fixed tube, respectively. The two connecting rods are connected to the two base plates, respectively.

In an embodiment, the two ends of each connecting rod is connected to the center of each side wall and to the center of the corresponding base plate, respectively.

In an embodiment, each base plate has a plurality of through holes arranged around the center of the base plate.

In an embodiment, a region between the periphery of each side wall of the cylinder and the periphery of the corresponding base plate is completely open.

In comparison with the prior art, the movable element inside the balanced module e of the pressure balanced mixing device of the present invention is completely different from the movable spool of the conventional balanced module.

DETAILED DESCRIPTION OF EMBODIMENTS

Figure 1:
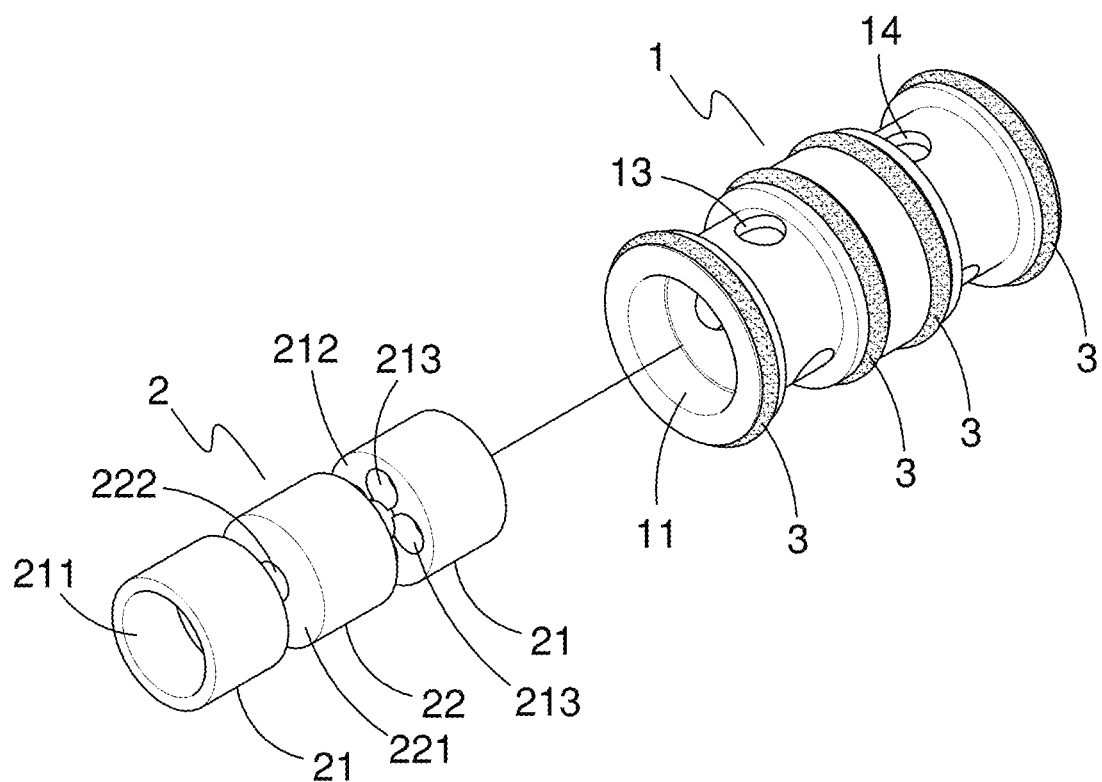
FIG. 1 is a perspective view of a preferred embodiment of the balanced module of the present invention.
Figure 2:
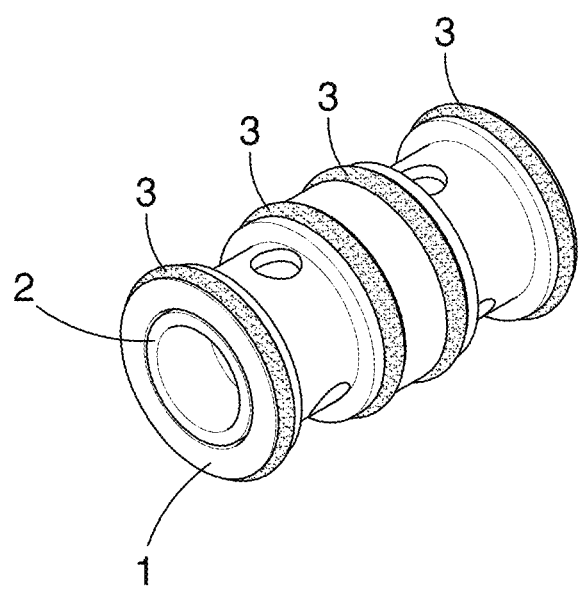
FIG. 2 is a perspective exploded view of the preferred embodiment.
Figure 3:
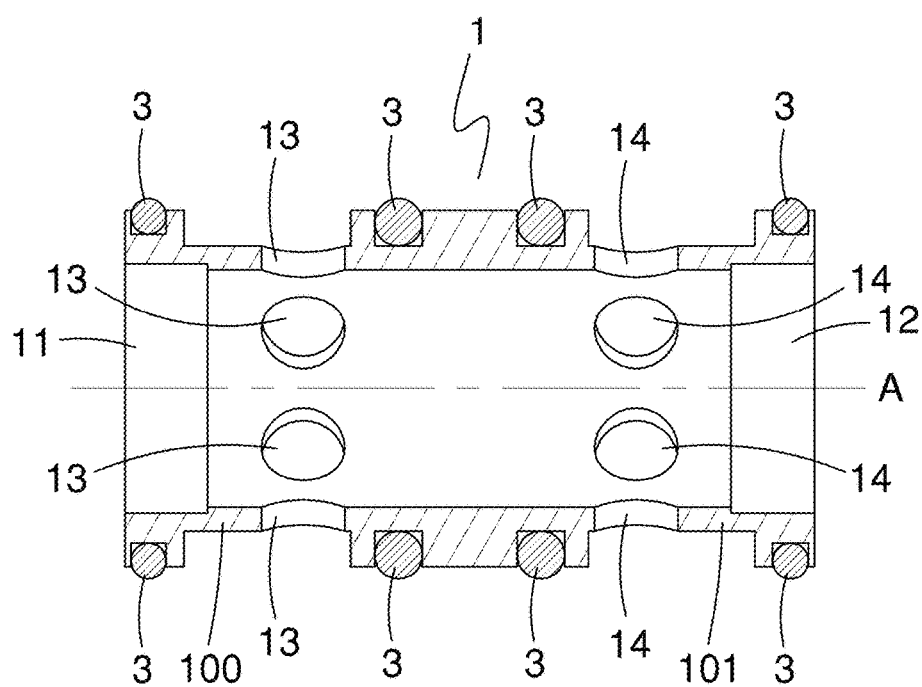
FIG. 3 is a sectional view of the fixed tube of the preferred embodiment.
Figure 5:
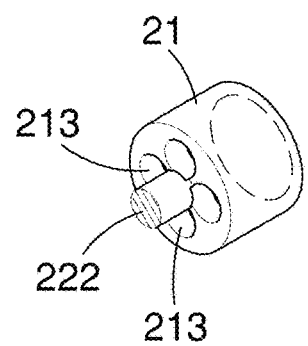
FIG. 5 is a partial perspective view of the movable element of the preferred embodiment.
Figure 4:
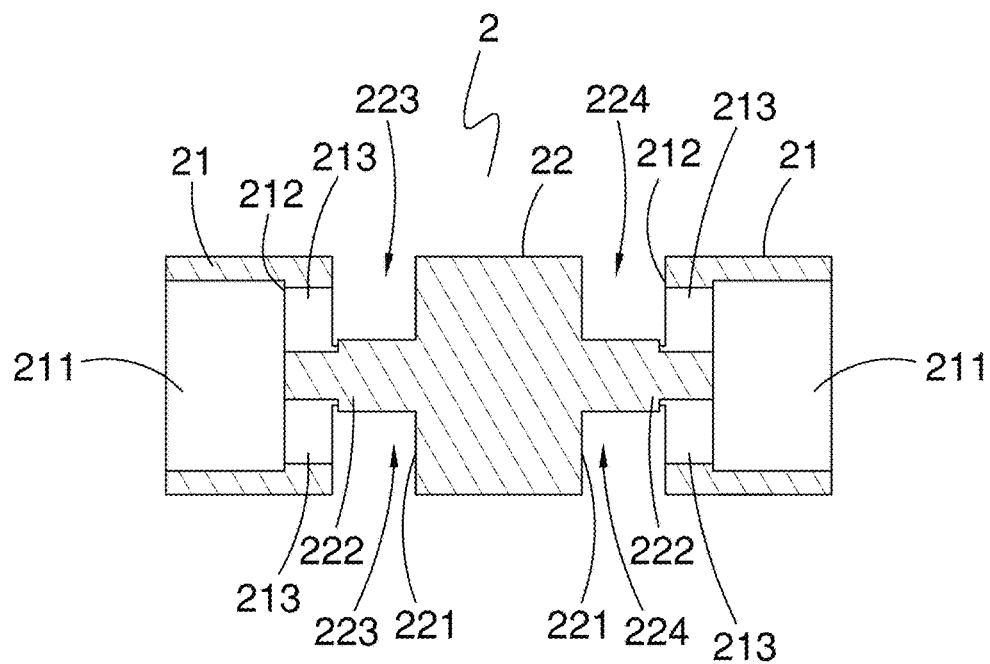
FIG. 4 is a sectional view of the movable element of the preferred embodiment
Figure 6:
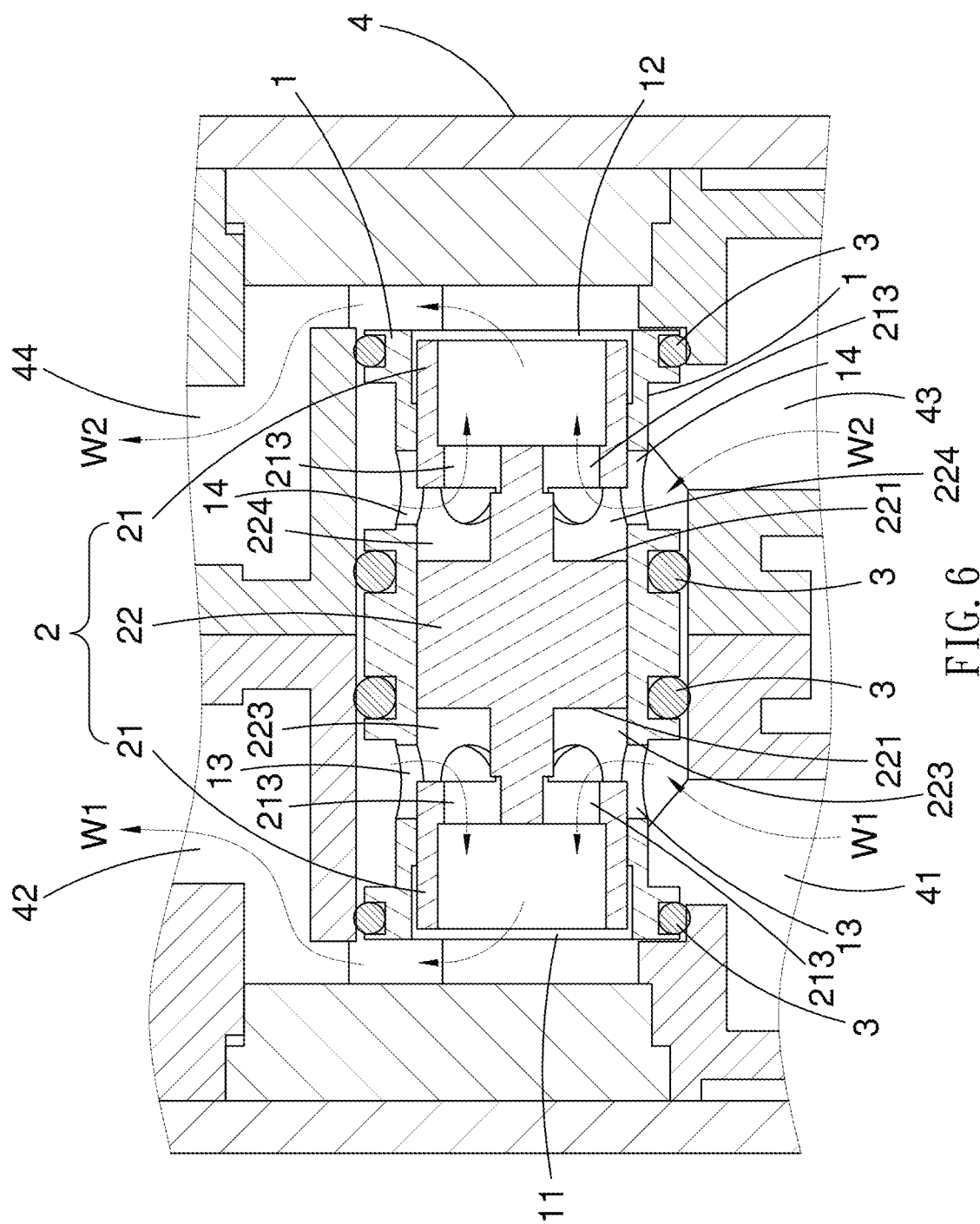
FIGS. 6-8 are partial perspective view the pressure balanced mixing device of the present invention.

As shown in FIGS. 1 and 2, a preferred embodiment of the balanced module of the present invention includes a fixed tube 1 and a movable element 2 movably disposed inside the fixed tube 1. As shown in FIGS. 1 and 3, the fixed tube 1 has a front section 100 and a rear section 101 in communication with each other. An end of the front section 100 forms a hot-water outlet 11. A wall of the front section 100 has at least a hot-water inlet 13. An end of the rear section 101 forms a cold-water outlet 12. A wall of the rear section 101 has at least a cold-water inlet 14. In this embodiment, the wall of the front section 100 has a plurality of hot-water inlets 13 surrounding the central axis A of the fixed tube 1 and the wall of the rear section 101 has a plurality of cold-water inlets 14 surrounding the central axis A of the fixed tube 1 As shown in FIGS. 1, 4 and 5, the movable element 2 includes two cups 21 and a cylinder 22 connected with the two cups 21, wherein the cylinder 22 is between the two cups 21. Each cup has an opening 211 and a base plate 212 opposite to the opening 211. Each base plate 212 has at least a through hole 213. In this embodiment, the base plate 212 has a plurality of through holes 213 surrounding the center of the base plate 212. The cylinder 22 has two opposite side walls 221 and two connecting rods 222 respectively extended outwards from the two opposite side walls 221, wherein one of the two side walls 221 is separated from the base plate 212 of one of the two cups 21 by a hot-water space 223, the other side wall 221 is separated from the base plate 212 of the other cup 21 by a cold-water space 224. In this embodiment, a region between the periphery of each side wall 221 of the cylinder 22 and the periphery of the corresponding base plate 212 is completely open. Therefore, the hot-water space 223 and the cold-water space 224 are completely open, so that the hot water (or the cold water) can enter directly into the hot-water space 223 (or the cold-water space 224) through the hot-water inlet 13 (or the cold-water inlet 14) of the fixed tube 1. The two connecting rods 222 are connected to the two base plates 212, respectively. In this embodiment, the two ends of each connecting rod 222 is connected to the center of each side wall 221 and to the center of the corresponding base plate 212, respectively. Moreover, each spacing between the cup 21 and the cylinder 22 is equal. As shown in FIG. 6, the interior of a control valve 4 has a hot-water inlet passage 41, a hot-water outlet passage 42, a cold-water inlet passage 43 and a cold-water outlet passage 44. The fixed tube 1 is fixed by being inserted into the interior of the control valve 4 by a plurality of seal rings 3. The hot-water inlet 13 of the fixed tube 1 is in communication with the hot-water inlet passage 41. The cold-water inlet 14 is in communication with the cold-water inlet passage 43. The hot-water outlet 11 is in communication with the hot-water outlet passage 42. The cold-water outlet 12 is in communication with the cold-water outlet passage 44. The detailed construction of the control valve is provided in TWI429838, which is from the same applicant, and is applicable to other type of control valve as well. The movable element 2 is inserted into the fixed tube 1 and movable, so that the movable element 2 can move towards or backwards in accordance with the water pressure on the two side walls 221 of the cylinder 22. The hot-water space 223 of the movable element 2 is in communication with the hot-water inlet 13 of the fixed tube 1. The cold-water space 224 is in communication with the cold-water inlet 14 of the fixed tube 1. The two cups 21 cover separately the hot-water inlet of the fixed tube 1 and the cold-water inlet of the fixed tube 1. The covered area can be adjusted in accordance with the movement of the movable element 2 in order to adjust the amount of hot water entering into the hot-water space 223 through the hot-water inlet 13 and the amount of hot cold entering into the cold-water space 224 through the cold-water inlet 14.

Figure 7:
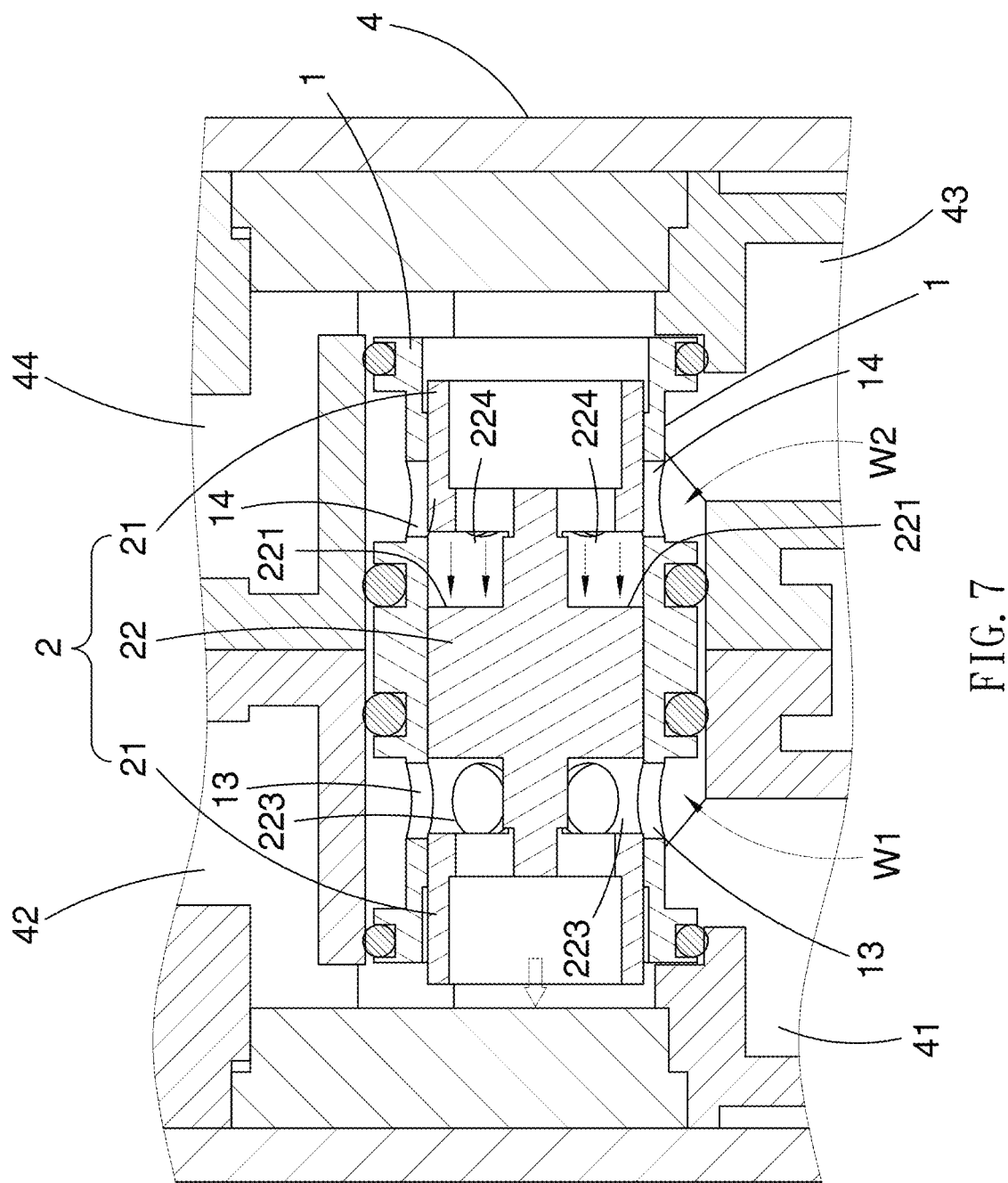
Figure 8:
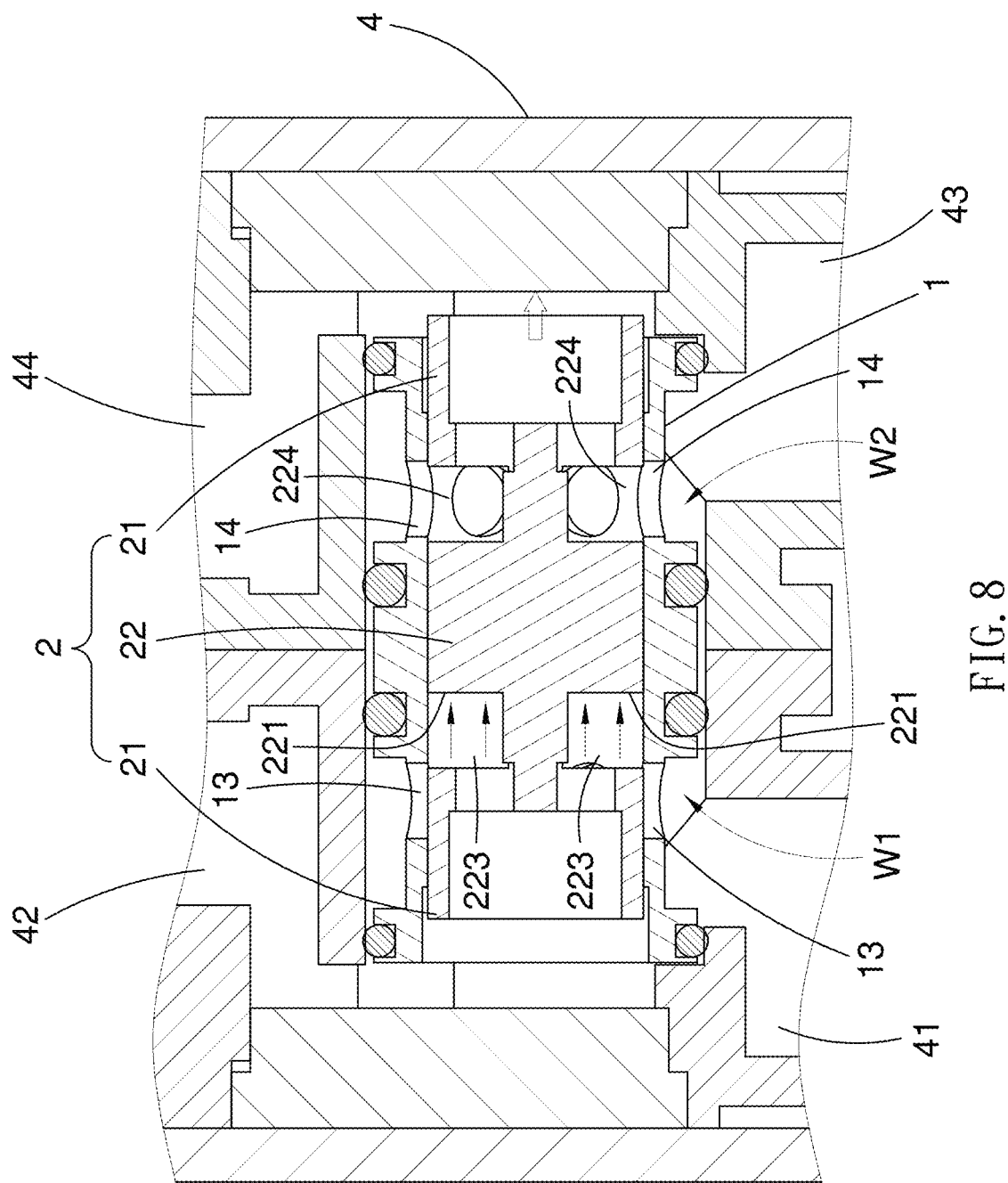

As shown in FIG. 6, the amount of the hot water W1 from the hot-water inlet passage 41 is substantially equal to the amount of the cold water W2 from the cold-water inlet passage 43 and the arrow indicates that after entering into the hot-water inlet 13 of the fixed tube 1, the hot water W1 flows through the through holes 213 of one of the cups 21, the interior of the cup 21, and the hot-water outlet 11 of the fixed tube 1, then flows out from the hot-water outlet passage 42; after entering into the cold-water inlet 14 of the fixed tube 1, the cold water W2 flows through the through holes 213 of the other cup 21, the interior of the cup 21, and the cold-water outlet 12 of the fixed tube 1, then flows out from the cold-water outlet passage 44. At the same time, the amount of the hot water entering into the hot-water space 223 from the hot-water inlet 13 is substantially equal to the amount of the cold water entering into the cold-water space 224 from the hot-water inlet 14, so that the water pressures on both of the side walls 221 of the cylinder 22 of the movable element 2 are substantially equal. Therefore, the cylinder 22 is located substantially in the middle of the fixed tube 1 and the area of hot-water inlet 13 covered by one of the cups 21 is substantially equal to the area of cold-water inlet 14 covered by the other cup 21. Once the flow rate of the hot water W1 drops (or decreases sharply to zero), the water pressures on both of the side walls 221 of the cylinder 22 of the movable element 2 changes immediately. That is, the water pressure in the hot-water space 223 is lower than the water pressure in the cold-water space 224, so that the water pressure in the cold-water space 224 pushes on the side wall 221 on the right of the cylinder 22, as shown in FIG. 7, to make the movable element 2 move forward. At the same time, the cold-water inlet 14 will be heavily covered (or totally covered) by the cup 21 on the right, so that the flow rate of the cold water W2 will drop (or decrease sharply to zero). Therefore, the flow rate of the cold water W2 can be reduced in order to avoid accident caused by the sudden decrease in the flow rate of the hot water W1. Conversely, once the flow rate of the cold water W2 drops (or decreases sharply to zero), the water pressure in the cold-water space 224 will be lower than the water pressure in the hot-water space 223, so that the water pressure in the hot-water space 223 pushes on the side wall 221 on the left of the cylinder 22, as shown in FIG. 8, to make the movable element 2 move backwards. At the same time, the hot-water inlet 13 will be heavily covered (or totally covered) by the cup 21 on the left, so that the flow rate of the hot water W1 will drop (or decrease sharply to zero). Therefore, the flow rate of the hot water W1 can be reduced in order to avoid accident caused by the sudden decrease in the flow rate of the cold water W2. In comparison with the prior art, the balanced module of the present invention can automatically adjust the amount of hot water and of cold water in accordance with the change of hot and cold water pressure. Moreover, the construction of the movable element 2 has dramatically changed, wherein the cup 21, the cylinder 22 and the cup 21 are arranged in a sequence. The change of the construction of the movable element 2 includes the connecting rods 222 which is for connecting the cup 21, the cylinder 22 and the cup 21 in sequence, wherein the base plate 212 of each cup 21 is not completely penetrated. Therefore, after entering into the hot-water space 223 (or the cold-water space 224) of the movable element 2 described above through the hot-water inlet 13 (or the cold-water inlet 14), the hot water (or the cold water) does not flow directly without being blocked and flow out from the hot-water outlet 11 (or the cold-water outlet 12) of the fixed tube 1. That is, the base plate 212 of each cup 21 provides the movable element 2 some cushioning effects.

What is claimed is:

1. A pressure balanced mixing device comprising a control valve and a balanced module configured within the control valve, the control valve having an interior space, the interior space having a cold-water inlet passage, a cold-water outlet passage, a hot-water inlet passage, and a hot-water outlet passage, the balanced module comprising a fixed tube fixed in the interior space of the control valve and a movable element movably disposed inside the fixed tube, wherein:

the fixed tube comprises a front section and a rear section in communication with each other, wherein an end of the front section forms a hot-water outlet, a wall of the front section has at least a hot-water inlet, an end of the rear section forms a cold-water outlet, a wall of the rear section has at least a cold-water inlet, wherein the cold-water inlet is in communication with the cold-water inlet passage, the hot-water inlet is in communication with the hot-water inlet passage, the cold-water outlet is in communication with the cold-water outlet passage, and the hot-water outlet is in communication with the hot-water outlet passage; and the movable element includes two cups and a cylinder connected with the two cups, wherein the cylinder is solid and between the two cups, the two cups separately block a cold-water inlet and a hot-water inlet of the fixed tube, wherein each cup has an opening and a base plate opposite to the opening, each opening is in communication with the hot-water outlet and the cold-water outlet of the fixed tube and each base plate has a through hole, the cylinder has two opposite side walls and two connecting rods separately extended outwards from the respective center of the two opposite side walls, wherein one of the two opposite side walls is separated from the base plate of one of the two cups by a hot-water space, the other side wall is separated from the base plate of the other cup by a cold-water space, the hot-water space and the cold-water space separately in communication with the hot-water inlet and the cold-water inlet of the fixed tube, the two connecting rods are solid and connected to the respective center of the two base plates.

2. The pressure balanced mixing device according to claim 1, wherein the two ends of each connecting rod are connected to a center of each side wall and to a center of the corresponding base plate, respectively.

3. The pressure balanced mixing device according to claim 2, wherein each base plate has a plurality through holes arranged around the center of the base plate.

4. The pressure balanced mixing device according to claim 1, wherein a region between the periphery of each side wall of the cylinder and the periphery of the corresponding base plate is completely open.

* * * * *